(12) United States Patent
Ouerghemmi et al.

(10) Patent No.: US 12,421,157 B2
(45) Date of Patent: Sep. 23, 2025

(54) DEVICE FOR MODIFYING THE TEMPERATURE OF A FIBRE-FORMING PLATE

(71) Applicant: SAINT-GOBAIN ISOVER, Courbevoie (FR)

(72) Inventors: Ezzeddine Ouerghemmi, Antony (FR); Hans Michael Lieberknecht, Margny les Compiegne (FR); Jean-Dominique Depuille, Agnetz (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 735 days.

(21) Appl. No.: 16/980,601

(22) PCT Filed: Mar. 13, 2019

(86) PCT No.: PCT/FR2019/050548
§ 371 (c)(1),
(2) Date: Sep. 14, 2020

(87) PCT Pub. No.: WO2019/175504
PCT Pub. Date: Sep. 19, 2019

(65) Prior Publication Data
US 2021/0047227 A1    Feb. 18, 2021

(30) Foreign Application Priority Data

Mar. 14, 2018   (FR) ......................................... 1852205

(51) Int. Cl.
*C03B 37/04*     (2006.01)
*D04H 1/4218*    (2012.01)
*C03C 13/06*     (2006.01)

(52) U.S. Cl.
CPC ......... *C03B 37/048* (2013.01); *D04H 1/4218* (2013.01); *C03C 13/06* (2013.01); *D10B 2101/06* (2013.01)

(58) Field of Classification Search
None
See application file for complete search history.

(56) References Cited

U.S. PATENT DOCUMENTS 3,902,878 A * 9/1975 Hoag, Jr. ................. D04H 3/03
65/447
5,876,529 A * 3/1999 Grant ....................... D01D 5/18
156/62.4

FOREIGN PATENT DOCUMENTS

FR   2 993 265 A1   1/2014
FR   3 039 535 A1   2/2017
(Continued)

OTHER PUBLICATIONS

JP 2016-523795 machine translation, Julianne Thierry, Method and apparatus for producing mineral fibers, Aug. 12, 2016 (Year: 2016).*
(Continued)

*Primary Examiner* — Queenie S Dehghan
(74) *Attorney, Agent, or Firm* — Pillsbury Winthrop Shaw Pittman LLP (57) ABSTRACT

A fibre forming device for fabricating mineral fibres, includes a fibre forming spinner wheel pierced to enable centrifugal fabrication of the fibres, the fibre forming device including at least one annular burner producing an annular gas flow to stretch the fibres and an evacuation system for evacuating smoke created by the burner, the device further including a system adapted to vary the temperature of the spinner wheel, the temperature variation system being a device for circulation of air between the annular burner and the evacuation system to control the smoke evacuation flow.

14 Claims, 4 Drawing Sheets (56) References Cited

FOREIGN PATENT DOCUMENTS

| | | | | |
|---|---|---|---|---|
| WO | WO-9715532 A1 | * | 5/1997 | ............ C03B 37/048 |
| WO | WO-0149619 A1 | * | 7/2001 | ............ C03B 37/048 |

OTHER PUBLICATIONS

CN 86106594 machine translation, Cartner Hans et al. Using Heat conducting plastic material, Apr. 1987 (Year: 1987).*
International Search Report as issued in International Patent Application No. PCT/FR2019/050548, dated Apr. 30, 2019.

* cited by examiner

DEVICE FOR MODIFYING THE TEMPERATURE OF A FIBRE-FORMING PLATE

CROSS-REFERENCE TO RELATED APPLICATIONS

This application is the U.S. National Stage of PCT/FR2019/050548, filed Mar. 13, 2019, which in turn claims priority to French patent application number 1852205 filed Mar. 14, 2018. The content of these applications are incorporated herein by reference in their entireties.

The present invention relates to the field of fibre forming devices.

PRIOR ART

So-called insulation glass fibres are routinely produced by internal centrifuging, that is to say by introducing a stream of molten glass into a centrifuge also known as a fibre forming spinner wheel rotating at high speed and having at its periphery a very large number of orifices. Because of the action of the centrifugal force, the glass is projected through these orifices in the form of filaments. There may be added to the centrifugal force stretching by a gas flow at high temperature and high speed emitted tangentially to the perforated wall of the centrifuge. In these techniques, the centrifuge is very highly loaded by stresses of mechanical origin (high rotation speed), thermal origin (glass at around 1000° C.) and chemical origin (corrosion by the glass). Now the quality of the fibres produced depends very greatly on the correct operation of the centrifuge, that is to say its state of wear and compliance with speed temperature setpoints.

There is hardly any reason for the speed to be modified by disturbances during fabrication, and above all else it may be entirely controlled independently of all of the other parameters if the choice is made for example to drive the shaft by an appropriately controlled asynchronous motor. The setpoint for the rotation speed may therefore be considered to be strictly complied with.

On the other hand the temperature of the centrifuge is sensitive to a good number of factors, for example the action of internal burners heating the interior of the centrifuge and complementary heating means, for example using magnetic induction, aimed more specifically at the bottom of the centrifuge, the temperature of the glass, the flow rate of the glass, the temperature of the stretching gas flow, if any, emitted in the immediate vicinity of the centrifuge or in any event the hotter or cooler ambiance around the centrifuge, the greater or lesser cooling because of the rotation at higher or lower speed and the centrifuge itself which may notably be deformed after a certain time of use and because of this be heated differently by the burners.

Moreover, the quality of the fibres is dependent on the gas flow that enables stretching of the fibres. In fact, the gas flow and the temperature of said flow make it possible to define the degree of stretching of the fibres. Now, this degree of stretching makes it possible to achieve a certain fibre quality.

At present, the burner is adjusted by adjusting the fuel/oxidizer arrival parameters, which leads to a modification of the gas flow and/or of the temperature. This modification of the gas flow and/or of the temperature therefore implies a modification of the quality of the fibres.

There is therefore a requirement for a fibre forming device in which the temperature of the spinner wheels can be adjusted without modification of the gas flow.

SUMMARY OF THE INVENTION

The present invention therefore proposes to remove these disadvantages by providing a device enabling accurate adjustment of the temperature of the fibre forming spinner wheel.

To this end, the invention concerns a fibre forming device for fabricating mineral fibres, comprising a fibre forming spinner wheel pierced to enable fabrication of fibres by internal centrifuging, the fibre forming device comprising at least one annular burner producing an annular gas flow to stretch the fibres and an evacuation system for evacuating smoke created by said burner, characterized in that said fibre forming device further comprises a means for variation of the temperature of said spinner wheel comprising an air circulation device adapted to control the smoke evacuation flow.

This fibre forming device advantageously makes it possible to modify the temperature of a zone of the fibre forming spinner wheel with a view to regulation.

According to one example, the fibre forming spinner wheel comprises an annular wall pierced by a plurality of orifices extended laterally by a top part and a bottom part, said air circulation device being adapted to modify locally the temperature at a point of said spinner wheel.

According to one example, the air circulation device is adapted to modify the temperature locally at the junction of the top part and the annular wall.

According to one example, the air circulation device includes a main pipe having a first end connected to a first secondary pipe used as an air outlet and a second end connected to a second secondary pipe in which the air enters, said air circulation means further comprising means for variation of the flow adapted to generate an additional flow in the main pipe adding to or opposing the incoming flow of air.

According to one example, the means for variation of the flow comprise a turbine adapted to be controlled and rotated in the clockwise or anticlockwise direction to supply a flow in two distinct directions.

According to one example, the means for variation of the flow comprise two turbines, each turbine is adapted to supply a flow in a single direction, said turbines being placed so that their flows are in opposite directions.

According to one example, the means for variation of the flow comprise two air injection nozzles connected to an air compressor circuit provided with valves, said air injection nozzles being arranged at the centre of the main pipe, said main pipe having a varying diameter enabling the creation of a reduced pressure.

According to one example, said two air injection nozzles are each placed at one end of the main pipe, said main pipe having at each end a greater diameter to enable the creation of the reduced pressure.

According to one example, the means for variation of the flow comprise two annular air injection nozzles connected to an air compressor circuit provided with valves, said annular air injection nozzles having an annular outlet generating an annular or partially annular jet of air and said annular air injection nozzles are such that the annular jet of air is diffused along the interior wall of the pipe enabling the creation of a reduced pressure.

According to one example, the second secondary pipe comprises an interior wall and an exterior wall that are parallel and such as to have a U-shape profile with two parallel branches interconnected by a perpendicular branch, the two parallel branches being open so that each enables the smoke to enter it, an opening being produced in line with the perpendicular branch for the connection of said second secondary pipe to the main pipe.

According to one example, the fibre forming device further comprises a second means for variation of the temperature of said spinner wheel arranged to face the bottom part of said spinner wheel.

The presence of this second means for variation of the temperature of said spinner wheel associated with the first means for variation of the temperature enables complementary action and refined modification of the temperature of the spinner wheel at different locations and a temperature profile to be obtained in which a plurality of points are regulated.

According to one example, the top part is a web connecting the spinner wheel to the drive shaft and the bottom part is an interior lip bent toward the drive shaft.

According to one example, the top part is an interior lip bent toward the drive shaft and the bottom part is a web forming the bottom of the spinner wheel.

The invention further concerns a method for modification of the temperature of a fibre forming spinner wheel of a fibre forming device according to the invention, characterized in that it comprises the following steps:

measuring the temperature at a point of said spinner wheel by means of a measuring module;
comparing the temperature measured by said measuring module to a setpoint value;
modifying the smoke evacuation flow by generating an additional flow in the main pipe added to or opposing said evacuation flow by said air circulation device.

According to one example, said air circulation device is adapted to modify the temperature at the junction of the top part and the annular wall.

According to one example, the flow is modified manually.

According to one example, the flow is modified automatically.

According to one example, the step of modification of the smoke evacuation flow comprises a sequence of injection of an additional flow added to said evacuation flow and/or a sequence of injection of an additional flow opposing said evacuation flow.

The present invention further concerns a computer program including instructions for the execution of some or all of the steps of a method according to the invention when said program is executed by a computer.

The present invention also concerns a computer-readable storage medium on which is stored a computer program comprising instructions for the execution of some or all of the steps of a method according to the invention.

DESCRIPTION OF THE FIGURES

Other particular features and advantages will emerge clearly from the following description thereof given by way of nonlimiting illustration and with reference to the appended drawings in which.

DETAILED DESCRIPTION OF THE INVENTION

Figure 1A:
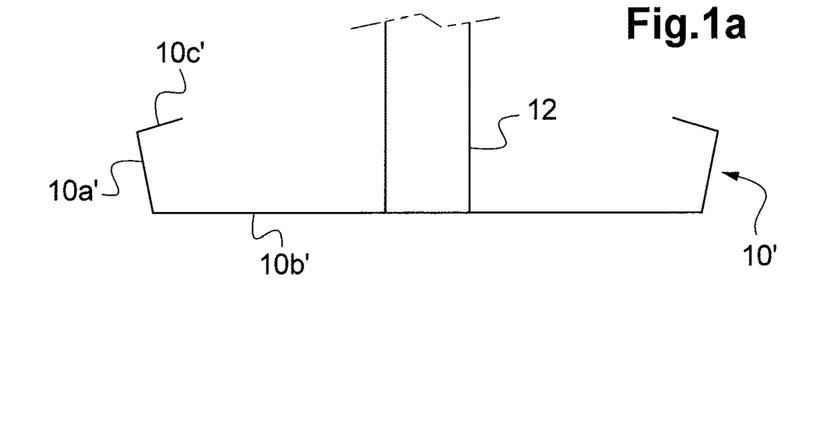
FIG. 1a is a diagrammatic representation of a fibre forming system according to the invention.

In FIG. 1 is shown a sectional view of a fibre forming system 1. A fibre forming system of this kind comprises a centrifuge 10 also known as a fibre forming spinner wheel connected to a drive shaft 12 rotating at high speed and having at its periphery a very large number of orifices. The glass is projected through these orifices in the form of filaments by the action of the centrifugal force.

Figure 1B:
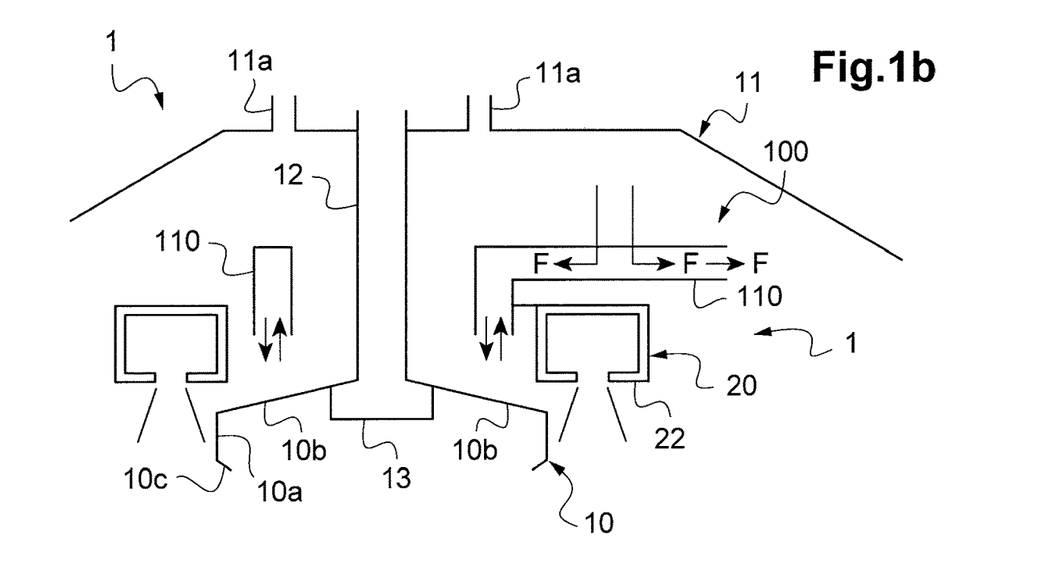
FIG. 1b is a diagrammatic representation of a variant centrifuge of the fibre forming system.

The fibre forming spinner wheel 10 is a micrometric diameter mineral fibre internal centrifuging device. A fibre forming spinner wheel 10 comprises an annular wall 10a pierced with a plurality of orifices extended laterally by an upper part and a lower part. In a first configuration, in FIG. 1, the upper part is a web 10b connecting the spinner wheel to the drive shaft and the lower part is an interior lip 10c bent in the direction of the drive shaft 12. In a second so-called spinner wheel with a bottom configuration shown in FIG. 1a (replacing the centrifuge beyond the dashed line) the upper part is an interior lip 10c' bent in the direction of the drive shaft and the lower part is a web 10b' forming the bottom of the spinner wheel 10'.

In a nonlimiting embodiment of the device shown in FIG. 1 the centrifuge is fixed to a shaft 12. The shaft 12 and the centrifuge 10 are driven with a rapid movement in rotation by means of a motor not shown. The shaft 12 is hollow and molten glass flows in the shaft from feed means not shown as far as a distributor basket 13 in which the molten glass spreads. The basket is also driven in rotation so that the molten glass is projected onto its peripheral wall which is pierced with orifices and, thence, in the form of voluminous streams onto the peripheral wall of the centrifuge, forming on this wall a permanent reserve of molten glass feeding the orifices pierced in said wall. This wall is inclined at approximately 1 to 10° to the vertical.

In a nonlimiting embodiment of the device shown in FIG. 1a the molten glass is feed along the side of the drive shaft onto the bottom of the fibre forming spinner wheel constituted by the web 10b'.

This fibre forming spinner wheel is heated by the heating module 20. The heating module 20 comprises an annular burner 22 enabling attenuation of the fibres. This annular internal combustion burner 22 includes a combustion chamber fed with fuel and with oxidizer, the chamber including an envelope having a closed first end and an opposite exhaust second open end through which the combustion gases escape, the envelope having at least two opposite walls that connect the two ends. The annular burner 22 includes in the chamber and at the level of the closed first end at least one combustion device fed with fuel and with oxidizer.

The glass filaments projected out of the orifices of the spinner wheel by the effect of the centrifugal force are then subjected to the action of an annular gas flow at high temperature and high speed from the annular burner 22 along the wall of the centrifuge which thins them and stretches them into fibres.

A fibre forming device of this kind also comprises a hood 11 for recovering and evacuating smoke.

According to the invention, the fibre forming device 1 further comprises a means for variation of the temperature of the spinner wheel 100. This means 100 for variation of the temperature is adapted to modify the temperature of a point of the spinner wheel. This point is preferably the point of the spinner wheel termed strip top or rounding. In fact, this point is situated in the junction zone between the upper part and the pierced annular wall 10a through which the molten glass passes. The means for variation of the temperature of the spinner wheel advantageously operates in a space between said spinner wheel 10 and the burner 22 without interfering with the stretching gas flow. The means 100 for variation of the temperature is therefore able to modify the temperature of the strip top point of the fibre forming spinner wheel 10 and thereby the temperature profile along the strip, independently of the stretching means.

Here the means 100 for variation of the temperature is a means 110 for circulation of air used to control the smoke evacuation flow F from the annular burner 22. Actually, it has been noted that the flow rate of this smoke significantly influences the spinner wheel rounding temperature and the thermal equilibrium of the spinner wheel. Consequently, according to the present invention the means 110 for circulation of air is a means enabling reduced or increased evacuation of smoke to the hood 11 in order to modify the temperature of the rounding (strip top) of a fibre forming spinner wheel. This means 110 for circulation of air is for example adapted to discharge between the burner-fibre forming spinner wheel assembly and the smoke evacuation system comprising for example a hood 11 provided with an evacuation pipe 11a.

Figure 2:
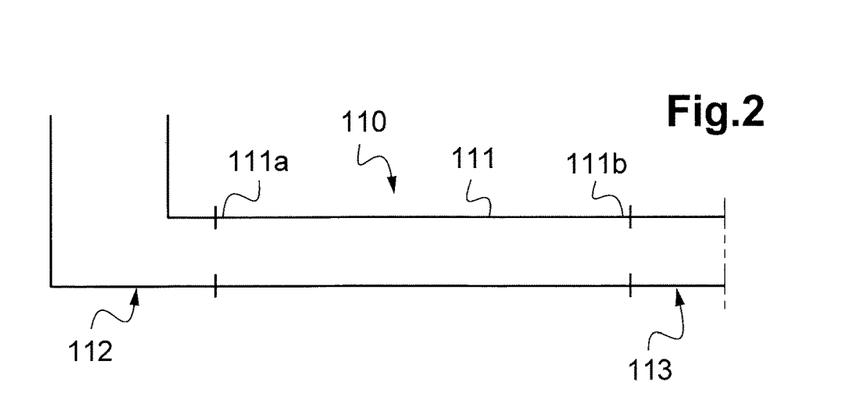
FIGS. 2 to 4 are representations of the air circulation means according to the invention.

In one embodiment, the means 110 for circulation of air takes the form shown in section in FIG. 2. The means 110 for circulation of air comprises a main pipe 111 having two ends. A first end 111a is termed the evacuation end and is connected to a first secondary pipe 112 also termed a chimney pipe. This first secondary pipe 112 is used to evacuate some of the smoke from the burner to the smoke evacuation system. A second end 111b is termed a collector end and is connected to a second secondary pipe 113 also termed a collector pipe. This second secondary pipe 113 is used to collect the smoke from the annular burner. To this end, this second secondary pipe 113 has a shape adapted to collect the smoke all around the fibre forming spinner wheel and it may therefore include an annular collector.

Figure 3:
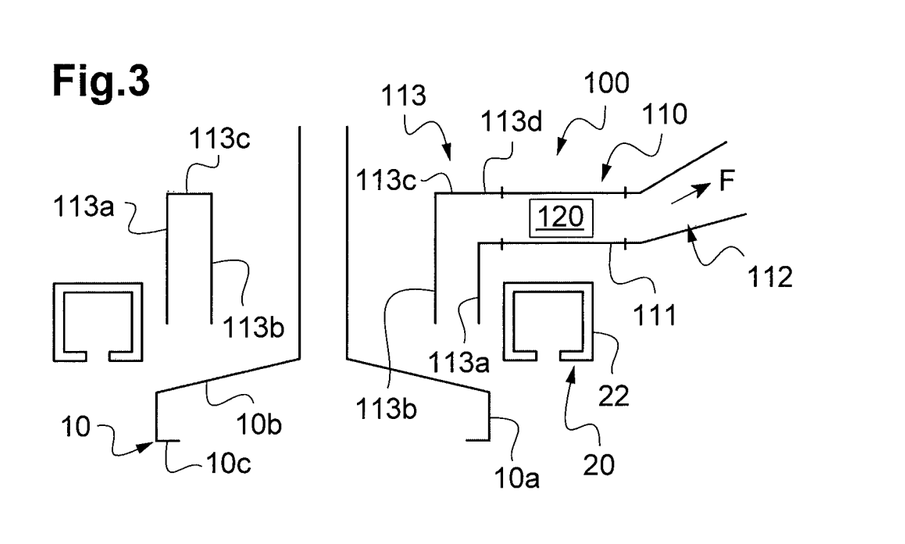
Figure 4:
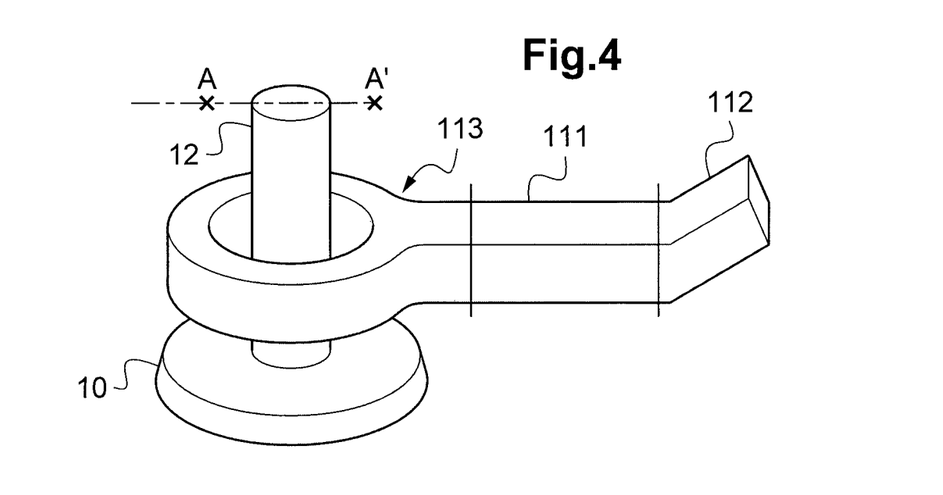

In a nonlimiting embodiment that can be seen in FIGS. 3 and 4, the second secondary pipe 113 has an annular shape i.e. comprises two concentric tubular walls, an interior wall 113b and an exterior wall 113a, connected by a flank 113c to form a U-shape profile channel i.e. one with two parallel branches 113a, 113b interconnected by a perpendicular branch 113c, the two parallel branches 113a, 113b forming opposite the flank an opening to enable the smoke to enter it as can be seen in FIG. 3 which is a sectional view taken along the line A-A' of the fibre forming device that can be seen in FIG. 4. For the connection of this second secondary pipe 113 to the main pipe 111 an opening may be made in the exterior tubular wall 113a in line with the perpendicular branch, this opening enabling a connecting pipe 113d to pass through it to make the connection with the main pipe 111. This pipe 113d can have a constant or non-constant section. In the case of a non-constant section (not shown) the opening at the level of the second secondary pipe 113 would have a section larger than that at the level of the main pipe 111. This limiting example has the advantage of being able to aspirate smoke all around the shaft 12 supporting the centrifuge 10.

Of course, the second secondary pipe 113 could have any of all the possible shapes enabling a similar result to be obtained, in particular a frustoconical shape formed by the interior wall 113b and the exterior wall 113a.

To make it possible to modify the smoke evacuation flow, the means 110 for circulation of air further comprises flow variation means 120 controlled by a control unit (not shown). These means 120 for variation of the flow of smoke are used to add an additional flow f in the pipes in order to add or to oppose the evacuation flow F. In the situation where the means 120 for variation of the flow add a flow of air f to the evacuation flow F they make it possible to create suction making it possible to increase the smoke evacuation flow rate. In the situation where the means 120 for variation of the flow of smoke creates a flow of air f directed in the opposite direction to the evacuation flow F it is a question here of creating a flow that acts like a back-pressure. This back-pressure flow is therefore created in a direction opposite to that of the evacuation flow F. Because of this, this back-pressure flow reduces the smoke evacuation flow rate.

Figure 5:
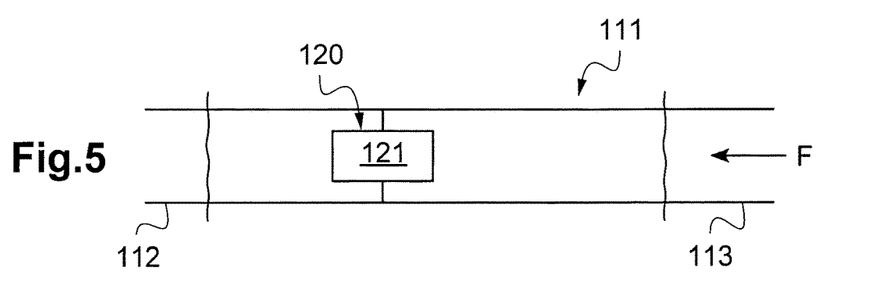
FIG. 5 is a diagrammatic representation of a first embodiment of means for variation of the flow used in the air circulation means.

In a first embodiment that can be seen in FIG. 5, the flow variation means comprise at least one turbine 121. This turbine is arranged in the main pipe 111 for easier integration.

In the case of a single turbine 121, the latter will be adapted to be bidirectional i.e. to allow rotation in the clockwise or anticlockwise direction. Consequently, depending on the direction of rotation of the turbine 121, it will be possible to improve the evacuation by aspirating the smoke more effectively or to slow down that evacuation by generating a back-pressure flow.

In the situation, not shown, of a plurality of turbines, two turbines 121 will be employed. Each turbine will have a dedicated rotation direction enabling suction or blowing. These turbines could have a fixed rotation speed or a rotation speed adjustable in order to modify the flow.

Figure 6A:
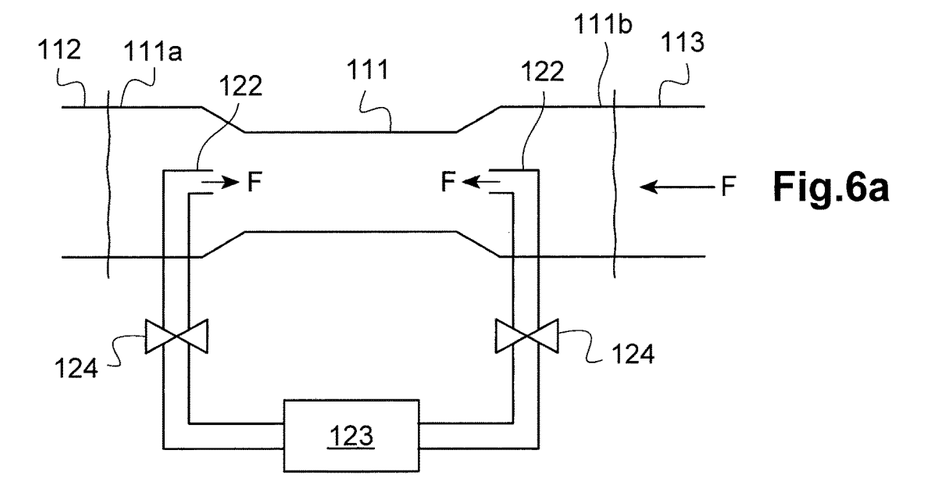
FIGS. 6a and 6b are diagrammatic representations of a second embodiment of the means for variation of the flow used in the air circulation means.
Figure 6B:
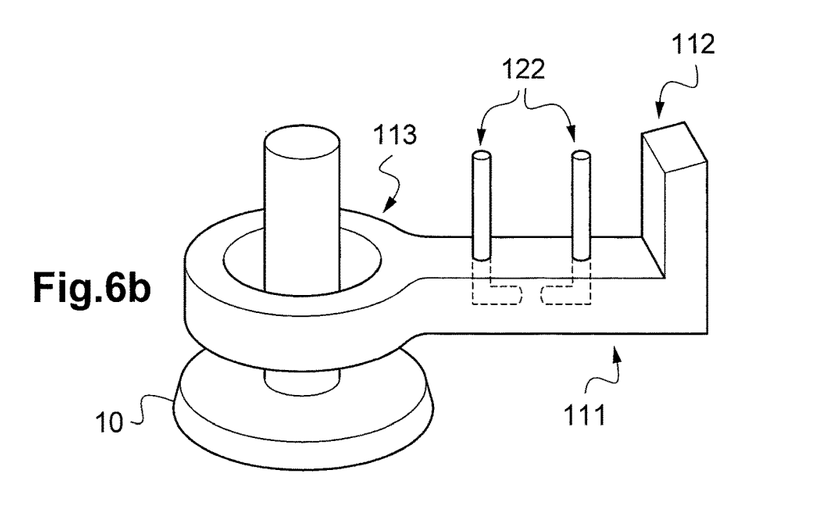

In a second embodiment that can be seen in FIGS. 6a and 6b the flow variation means comprise at least two air injection nozzles 122. These air injection nozzles 122 are connected to an air compressor circuit 123 by valves 124. These air injection nozzles 122 are adapted to inject an additional flow of air f having a power and/or a velocity greater than the normal smoke evacuation flow.

These air injection nozzles 122 are arranged at the level of the main pipe 111. The main pipe 111 may have a uniform or non-uniform diameter.

The air injection nozzles 122 are therefore placed at the level of the ends 111a, 111b of the main pipe. These air injection nozzles 122 are placed so as to have opposite injection directions, the air injection nozzle 122 at a first end of the main pipe injecting air in a direction counter to the direction of the air injected by the air injection nozzle 122 at the second end.

This arrangement of the air injection nozzles 122 at the level of these ends 111a, 111b is such that these nozzles 122 are oriented toward the portion of the main pipe 111, operating as follows.

The air injection nozzle 122 oriented toward the end 111a, i.e. toward the exhaust, operates so that the injection of air leads to an acceleration of the smoke in the adjacent zone. This acceleration therefore leads to a reduced pressure that aspirates the smoke to the outside and accelerates it.

The air injection nozzle 122 oriented toward the end 111b, i.e. toward the collector, operates so that the injection of air is opposite to the smoke evacuation flow F. This slows, reduces the smoke evacuation flow F.

These air injection nozzles 122 may be placed at the axial centre of the main pipe 111 or eccentrically.

For the adjustment of the temperature, two factors might be operated on, namely the temperature and the flow rate. In fact, the flow rate is used to create the phenomenon causing the suction. Thus a variation of the flow rate leads to a variation of the effect caused by this additional flow f. Thus in the case of suction of the smoke, if the flow rate of the additional flow f were increased then the smoke would be aspirated more intensely and thus the temperature would increase at the rounding of the spinner wheel. On the other hand, in the case of use of suction for blowing then the increase in the flow rate will lead to a reduction of the temperature.

In the case of the adjustment by modification of the temperature of the injected air, this will have an effect only in the blowing mode. In fact, this blowing mode is used to lower the temperature of the fibre forming spinner wheel. Thus, at constant flow rate, a reduction of the temperature of the injected air leads to a reduction of the temperature of the fibre forming spinner wheel.

A conventional cooling system using circulation of water may be used to modify the temperature of the injected air.

Figure 7A:
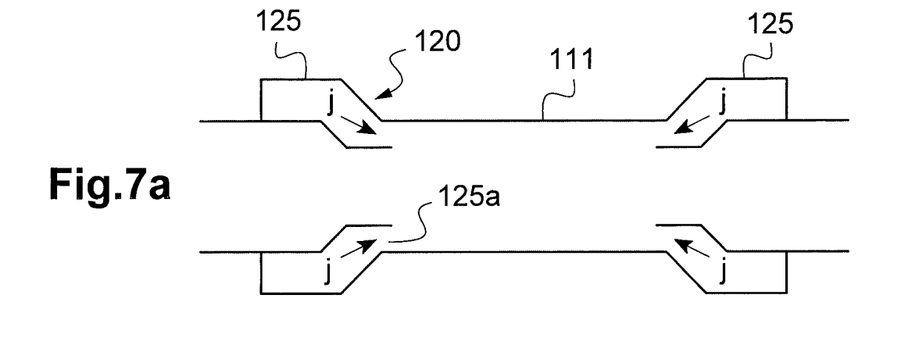
FIGS. 7a and 7b are diagrammatic representations of a third embodiment of the means for variation of the flow used in the air circulation means.
Figure 7B:
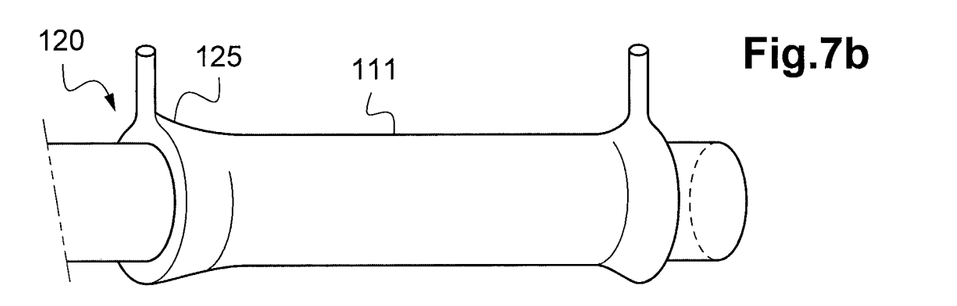

In a third embodiment that can be seen in FIGS. 7a and 7b the means 120 for variation of the flow comprise at least two air amplifiers 125. Each air amplifier consists of an annular air injection nozzle 125a arranged in the pipe. This annular air injection nozzle 125a has an outlet of annular shape and injects a jet of air j of annular shape into the pipe. The annular jet of air j could be subdivided or not. An annular jet j of this kind is a jet of air that is located on the interior wall of the pipe and that diffuses along that interior wall. This diffusion along the interior wall is made possible by the Coanda effect, whereby a jet of fluid is attached to a convex surface over which it flows, here the interior wall of the pipe. The annular jet of air leads to the appearance of a difference between the annular flow and the flow in the central part of the pipe, thus creating a reduced pressure. This reduced pressure generates suction.

The annular nozzles 125a are oppositely arranged in the pipe i.e. so that the two nozzles deliver flows in opposite directions. Accordingly, depending on the annular air injection nozzle that is activated, the reduced pressure generates suction that makes it possible to increase the evacuation of the smoke by aspiration thereof or to reduce the evacuation of the smoke by inducing suction countering the evacuation.

For the various embodiments, the adjustment could be carried out manually or automatically using a regulation device.

In order to have as smooth as possible a regulation the action on the various valves of the air circulation device will advantageously be carried out so that the valves are not commanded simultaneously. In fact regulation in which the opening of the valves to blow air i.e. the injection of an additional flow f that opposes the evacuation flow F and to aspirate air i.e. the injection of an additional flow f that is added to the evacuation flow F were modified simultaneously would be unstable with a temperature that would fluctuate and impact on the quality of the fibres.

On the other hand, so-called sequential regulation would enable less temperature fluctuation. In concrete terms, regulation of this kind means that the valve in use is closed before the valve in the other circuit is opened. The regulation therefore comprises a plurality of sequences. In an example in which the air circulation device is in suction mode, i.e. the temperature is increased, the reduction of the temperature is effected by closing this aspiration valve. If closing is sufficient then the valve of the blower circuit is not opened. On the other hand, if the temperature has not fallen sufficiently by the closure of the aspiration valve then the blower valve is progressively opened. Thus the step of modification of the smoke evacuation flow F comprises a sequence of injection of an additional flow f added to said evacuation flow and/or a sequence of injection of an additional flow opposing said evacuation flow.

Figure 8:
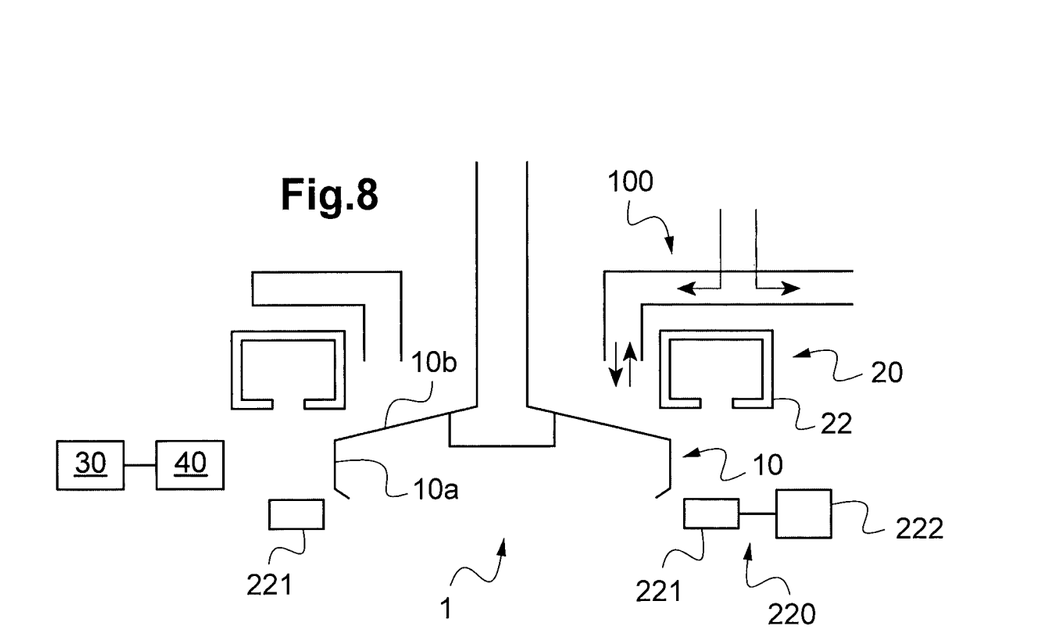
FIG. 8 is a diagrammatic representation of a fibre forming system using first means for variation of the temperature and second means for variation of the temperature.

Another temperature variation means is used in a variant that can be seen in the FIG. 8 sectional view. This second means for variation of the temperature of the spinner wheel 220 comprises an induction coil 221 connected to a frequency generator 222 that serves as a first temperature variation means. This frequency generator 222 generates a signal SI sent to the induction coil 221. It is this signal that enables modulation of the induction power of the induction coil 222 and enables variation of the heating temperature. Remember that the induction coil 221 when it has the signal SI passed through it, which signal is a frequency-modulated electric current, generates a magnetic field which in turn induces electric currents in the nearby metal. The eddy current losses and the hysteresis losses produced in this metal dissipate thermal energy (heat) by the Joule effect. This induction coil 221 is arranged in the bottom part of the fibre forming spinner wheel and more particularly under the fibre forming spinner wheel. This induction coil is adapted to face the stream of fibres created by said spinner wheel in order to be able to heat locally this bottom zone of the spinner wheel.

Thus it is possible to have a spinner wheel profile that is precisely regulated since the first variation means using the air circulation device regulates the top point also known as the rounding of the spinner wheel whereas the second temperature variation means regulates the bottom point of the spinner wheel.

This regulation of the profile uses measurements of the temperatures of the spinner wheel. To obtain this plot, a first step consists in using a temperature sensor such as a pyrometer for example associated with an oscillating mirror. The mirror is caused to oscillate at a certain frequency to sweep the fibre forming spinner wheel 10 and to obtain a curve of the temperature as a function of the angular position of the mirror. The pyrometer may be pivotably mounted and therefore not associated with a mirror.

This curve is cleverly processed by the calculation unit in order to extract at least one specific point. A method of determination of specific points is then used.

According to the invention the method of determination of specific points comprises a first substep consisting in obtaining measurements of temperatures of the fibre forming spinner wheel by means of a temperature measurement module 40 to supply to a calculation unit 30 a curve representing the temperature as a function of the angular position of the temperature measuring device. These measurements may be recovered directly or recovered from a memory unit in which they are stored.

A second substep of the determination method consists in processing the data by means of the calculation unit 30 to calculate and to obtain the second derivative of the curve of the temperature as a function of the angular position of the mirror 43. This second derivative is used to search for specific/characteristic points. In fact, the second derivative makes it possible to obtain the variation of the slope.

In a third substep of the determination method, the second derivative of the curve of the temperature as a function of the angular position of the mirror 43 is analysed by the calculation unit 30 to search for specific/characteristic points. These specific/characteristic points are the points at which the second derivative is equal to zero.

It is therefore possible to define to what the characteristic point corresponds. It will be clear that the points representative of the strip bottom of the spinner wheel and of the rounding of the spinner wheel are on respective opposite sides of said hot spot, at the ends of the curve.

In the case of the present invention, two characteristic/particular points are searched for. These points correspond to the strip bottom of the spinner wheel and to the rounding of the spinner wheel.

Moreover, an optional fourth substep of the determination method may be carried out. This optional fourth substep consists in locating the hot spot of the fibre forming spinner wheel. To this end the calculation unit 30 searches for the absolute maximum of the curve that corresponds to said hot spot. This hot spot is the central specific/characteristic point between the points corresponding to the temperature of the strip bottom of the spinner wheel and to the rounding of the spinner wheel.

This use of the second derivative advantageously makes it possible to ignore fluctuations in the dimensions of the spinner wheel. In fact, the spinner wheel may find its dimensions vary with wear and/or vibrations. Now despite this variation of the dimensions of the spinner wheel its general shape remains exactly the same. The specific/characteristic points are therefore durable. This makes it possible always to be in a position to identify the specific points correctly. Accordingly, the resulting regulation is always carried out at precise specific points truly representative of the spinner wheel.

In a third step the temperature values of the particular points are used for regulation of the fibre forming spinner wheel 10.

Of course, the present invention is not limited to the examples shown and lends itself to diverse variants and modifications that will be apparent to the person skilled in the art.

The invention claimed is:

1. A fibre forming device for fabricating mineral fibres, comprising a fibre forming spinner wheel pierced to enable fabrication of fibres by internal centrifuging, the fibre forming device comprising at least one annular burner producing an annular gas flow to stretch the fibres and an evacuation system for evacuating smoke created by said burner, the fibre forming device comprising a drive shaft configured to rotate, the fibre forming spinner wheel being connected to the shaft wherein the fibre forming device further comprises a system adapted to vary the temperature of said fibre forming spinner wheel comprising an air circulation device adapted to control the smoke evacuation flow, the air circulation device being arranged above the fibre forming spinner wheel between the drive shaft and the annular burner, the air circulation device opening out above the fibre forming spinner wheel.

2. The fibre forming device according to claim 1, wherein the fibre forming spinner wheel comprises an annular wall pierced by a plurality of orifices, said annular wall being extended laterally by a top laterally extending part and a bottom laterally extending part, said air circulation device being adapted to modify locally the temperature at a point of said spinner wheel.

3. The fibre forming device according to claim 2, wherein said air circulation device is adapted to modify the temperature at the junction of the top part and the annular part.

4. The fibre forming device according to claim 2, wherein the top part is a web and the bottom part is an inner lip or in which the top part is an inner lip and the bottom part is a web.

5. The fibre forming device according to claim 1, further comprising a second system configured to vary the temperature of said fibre forming spinner wheel arranged to face a bottom part of said fibre forming spinner wheel.

6. The fibre forming device according to claim 1, further comprising a temperature measuring module configured to measure a temperature at a point of the fibre forming spinner wheel, wherein the system adapted to vary the temperature of the fiber forming spinner wheel is configured to adjust the smoke evacuation flow based on a comparison of the temperature measured by the temperature measuring module and a temperature setpoint value.

7. A fibre forming device for fabricating mineral fibres, comprising a fibre forming spinner wheel pierced to enable fabrication of fibres by internal centrifuging, the fibre forming device comprising at least one annular burner producing an annular gas flow to stretch the fibres and an evacuation system for evacuating smoke created by said burner, wherein the fibre forming device further comprises a system adapted to vary the temperature of said fibre forming spinner wheel, the system adapted to vary the temperature of the fiber forming spinner wheel comprising an air circulation device adapted to control the smoke evacuation flow so as to control said temperature of the fiber forming spinner wheel, wherein the air circulation device includes a main pipe having a first end connected to a first secondary pipe used as an air outlet and a second end connected to a second secondary pipe in which the smoke of the smoke evacuation flow enters, said air circulation device further comprising a system configured to vary the smoke evacuation flow, the system configured to vary the smoke evacuation flow being configured to generate an additional flow, the system configured to vary the smoke evacuation flow being switchable between a first configuration in which the additional flow has a first direction that is the same direction as the smoke evacuation flow so that the additional flow is added to the smoke evacuation flow and a second configuration in which the additional flow has a second direction opposed to the first direction so that the additional flow opposes the smoke evacuation flow, so as to vary the smoke evacuation flow.

8. The fibre forming device according to claim 7, wherein the system adapted to vary the smoke evacuation flow comprises a turbine arranged in said main pipe and adapted to be controlled and rotated in the clockwise or anticlockwise direction to place the system adapted to vary the smoke evacuation flow in the first configuration or in the second configuration.

9. The fibre forming device according to claim 7, wherein the system adapted to vary the smoke evacuation flow comprises two turbines, each turbine is adapted to supply said additional flow in a single direction, said turbines being placed so that their additional flows are in opposite directions.

10. The fibre forming device according to claim 7, wherein the system adapted to vary the smoke evacuation flow comprises two air injection nozzles connected to an air compressor circuit provided with valves, said air injection nozzles being arranged at a centre of the main pipe, said main pipe having a varying diameter enabling the creation of a reduced pressure.

11. The fibre forming device according to claim 10, wherein said two air injection nozzles are each placed at one end of the main pipe, said main pipe having at each end a greater diameter to enable the creation of the reduced pressure.

12. The fibre forming device according to claim 7, wherein the system adapted to vary the flow comprises two annular air injection nozzles connected to an air compressor circuit provided with valves, said annular air injection nozzles having an annular outlet generating an annular jet of air and said annular air injection nozzles are such that the annular jet of air is diffused along the interior wall of the pipe enabling the creation of a reduced pressure.

13. The fibre forming device according to claim 7, wherein a cross-section of the second secondary pipe is ring-shape such that the second secondary pipe comprises an interior wall and an exterior wall that are parallel to each other the second secondary pipe including a first opening to enable the smoke of the smoke evacuation flow to enter the second secondary pipe and a second opening for the connection of said second secondary pipe to the main pipe such that smoke of the smoke evacuation flow enters said second secondary pipe via the first opening and is conveyed to the main pipe via the second opening.

14. A fibre forming device for fabricating mineral fibres, comprising a fibre forming spinner wheel pierced to enable fabrication of fibres by internal centrifuging, the fibre forming device comprising at least one annular burner producing an annular gas flow to stretch the fibres and an evacuation system for evacuating smoke created by said burner, wherein the fibre forming device further comprises a system adapted to vary the temperature of said fibre forming spinner wheel, the system adapted to vary the temperature of the fiber forming spinner wheel comprising an air circulation device adapted to control the smoke evacuation flow so as to control said temperature of the fiber forming spinner wheel, wherein the air circulation device further comprises a system configured to vary the smoke evacuation flow, the system configured to vary the smoke evacuation flow being configured to generate an additional flow, the system configured to vary the smoke evacuation flow being switchable between a first configuration in which the additional flow has a first direction that has the same direction as the smoke evacuation flow so that the additional flow is added to the smoke evacuation flow and a second configuration in which the additional flow has a second direction opposed to the first direction so that the additional flow opposes the smoke evacuation flow, so as to vary the smoke evacuation flow, based on a comparison of a temperature measured by a temperature measuring module and a temperature setpoint value.

* * * * *